United States Patent [19]

Bienert et al.

[11] 4,370,774
[45] Feb. 1, 1983

[54] WINDSHIELD WIPER ASSEMBLY

[75] Inventors: Herbert Bienert, Besigheim; Dieter Hanselmann, Aldingen; Alfred Kohler; Hans Prohaska, both of Bietigheim-Bissingen, all of Fed. Rep. of Germany

[73] Assignee: ITT Industries, Inc., New York, N.Y.

[21] Appl. No.: 42,305

[22] Filed: May 25, 1979

[30] Foreign Application Priority Data

Jan. 6, 1978 [DE] Fed. Rep. of Germany ....... 2824014

[51] Int. Cl.³ ............................................. B60S 1/34
[52] U.S. Cl. ................................................ 15/250.2
[58] Field of Search .............. 15/250.2, 250.34, 250.19

[56] References Cited

U.S. PATENT DOCUMENTS

| | | | |
|---|---|---|---|
| 2,311,121 | 2/1943 | Nette et al. | 15/250.34 |
| 2,736,053 | 2/1956 | Oishei et al. | 15/250.19 |
| 2,844,839 | 7/1958 | Krohm | 15/250.2 |
| 3,769,654 | 11/1973 | Edele et al. | 15/250.34 |

FOREIGN PATENT DOCUMENTS 2356606 5/1975 Fed. Rep. of Germany ... 15/250.34

Primary Examiner—Edward L. Roberts
Attorney, Agent, or Firm—James B. Raden; Donald J. Lenkszus

[57] ABSTRACT

Windshield wiper assemblies include apparatus to compensate for lifting forces exerted on a wiper arm and blade when a vehicle travels at high speeds. The wiper assemblies include a wiper arm spring connected to a wiper rod which carries the wiper blade. One end of the spring is connected to a pin mounted on a lever. The lever is pivotally movable so that the spring force on the wiper rod may be increased to compensate for lifting forces.

18 Claims, 10 Drawing Figures

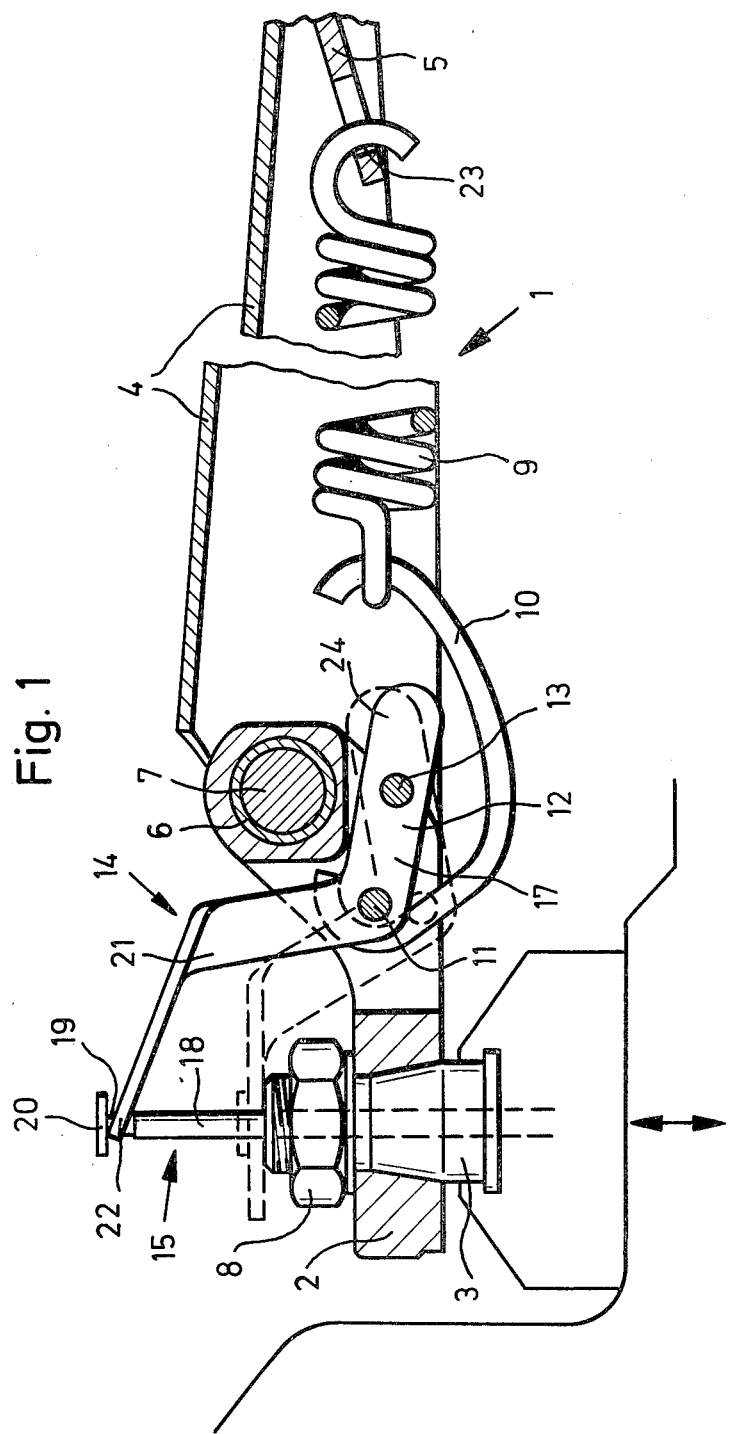

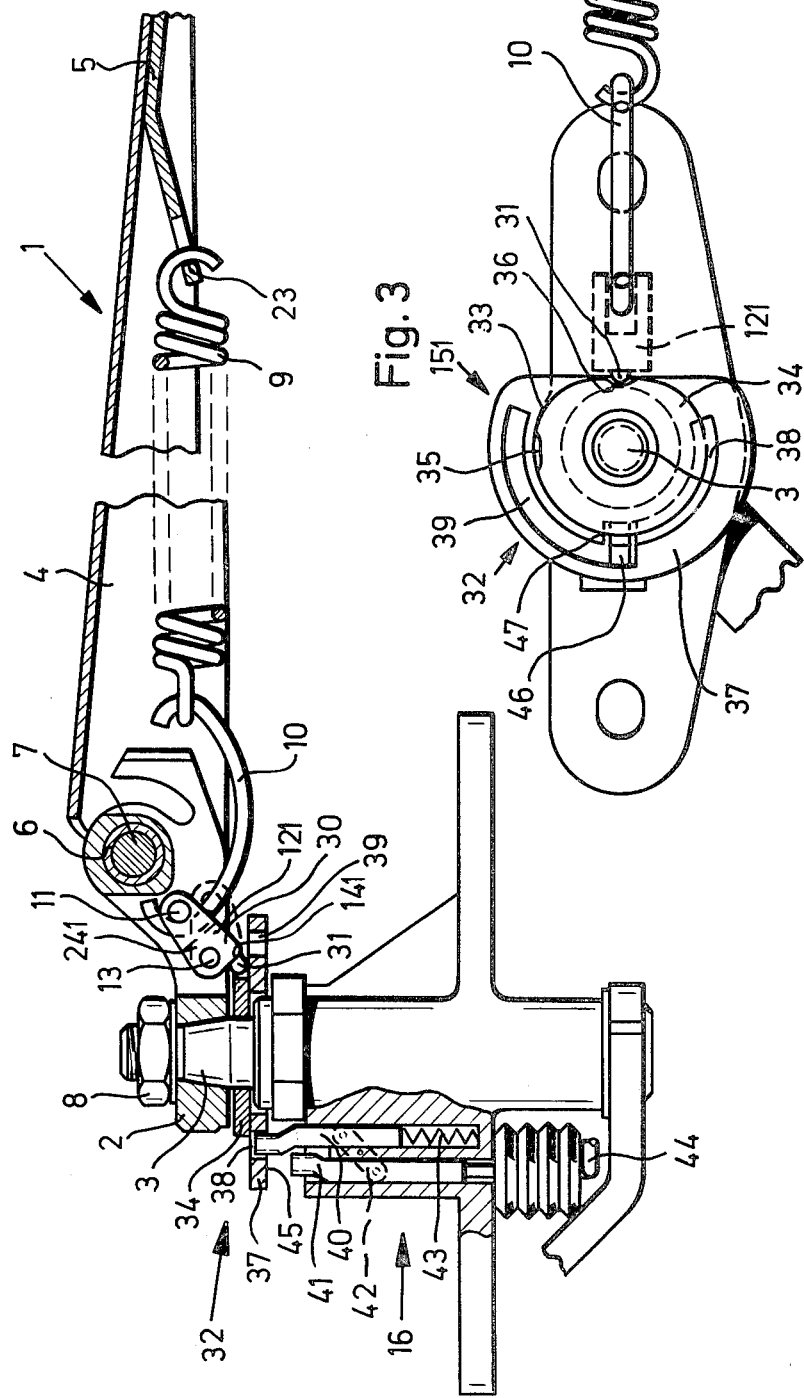

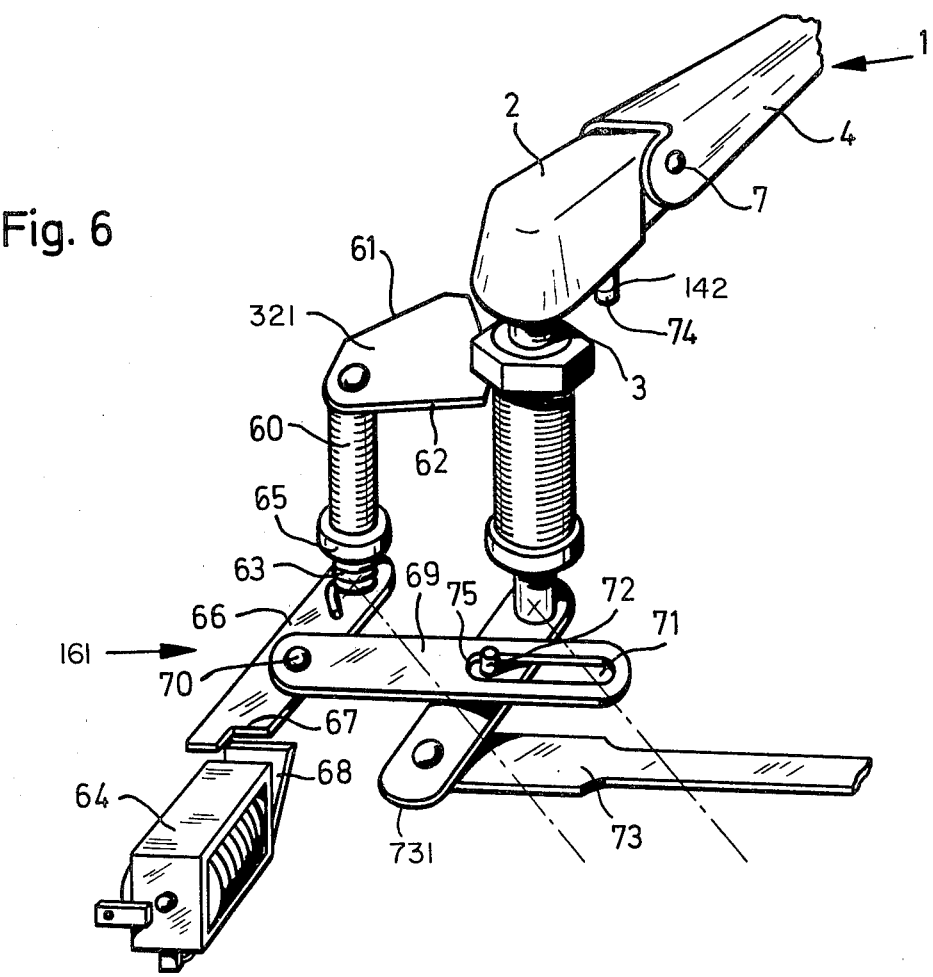

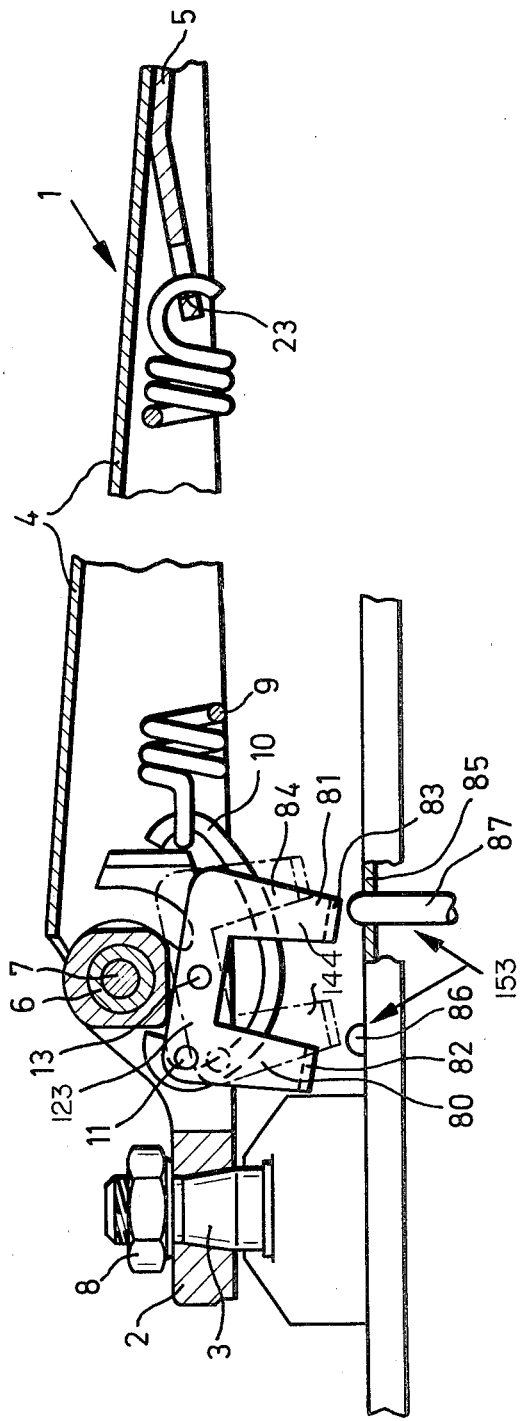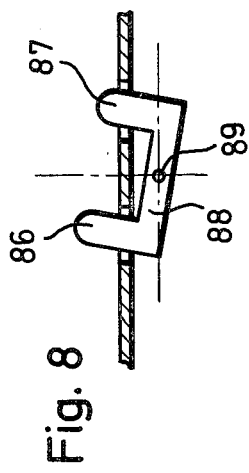

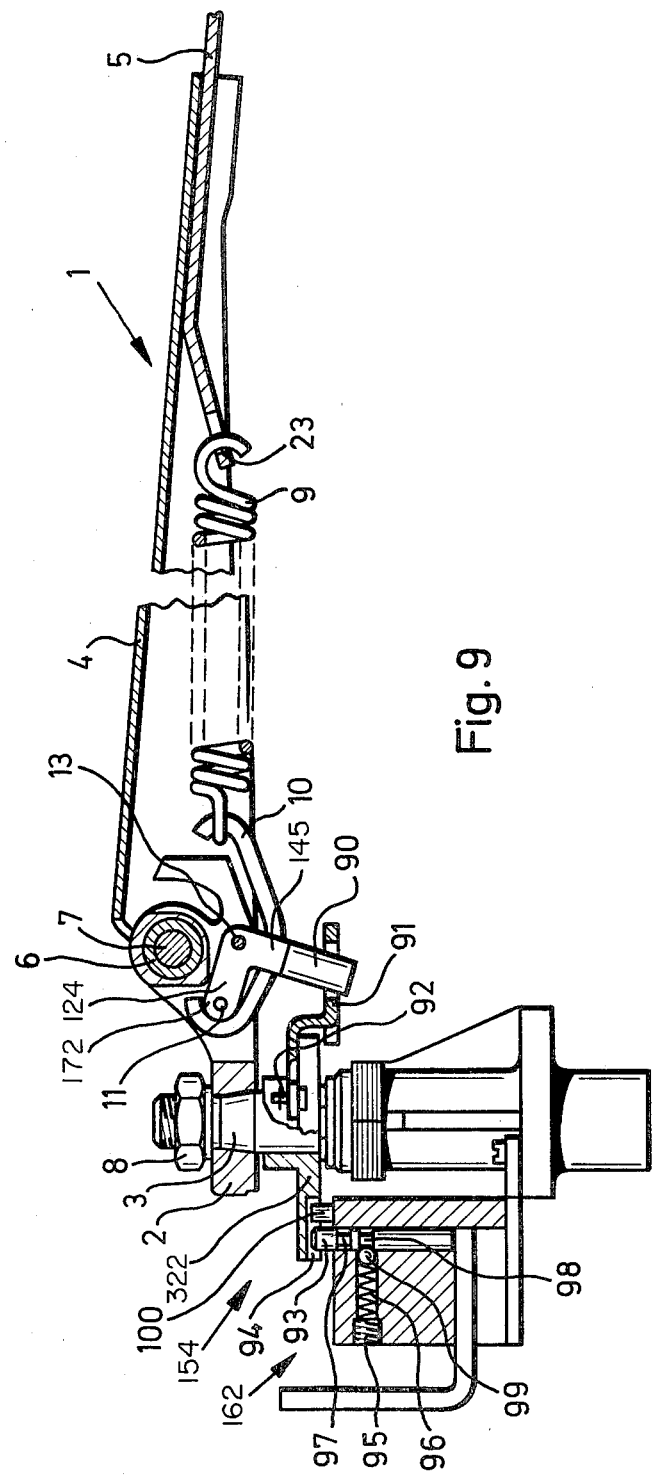

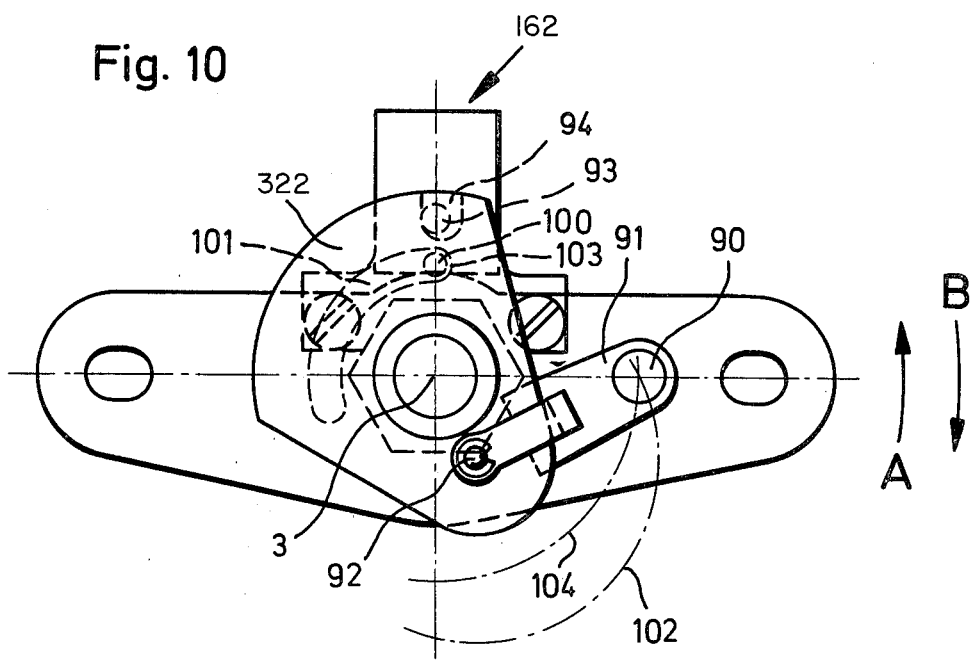

WINDSHIELD WIPER ASSEMBLY

BACKGROUND OF THE INVENTION

1. Field of the Invention

This invention pertains to a windshield wiper assembly of the type employed on motor vehicles.

2. Description of the Prior Art

At high vehicle speeds, the air impinging upon the windshield streams upwards and on both sides away from the windshield, such that it creates a lifting force on wiper blades and wiper arms. Thereby the contact pressure between windshield and wiper blade is reduced so that, especially in the lateral, intensely curved areas of the windshield, the cleaning effect of the windshield wiper installation is diminished. For safety, it is important that proper cleaning of the windshield is ensured at high driving speeds.

To avoid the lifting effect on the wiper blades, it has priorly been suggested to attach spoilers or other draft deflectors to the wiper blades and/or wiper arms to create an additional pressure directed against the lifting force. Because the surfaces of these draft deflectors must be small, they have only a slight effect. Such a solution is not advantageous from an aesthetical point of view.

It is known from German Pat. No. 2,314,724 to vary the pressure which the wiper arm, via the wiper blade, exerts on the windshield by means of a control cam attached on a disk. The disk is rotatably mounted on the wiper shaft and the curvature of the control cam is adapted to the windshield. The movement of a reversing bolt sliding on the control cam is transmitted to the holding pin of the wiper arm spring via a transversal pin and a wire yoke. Such a device is adapted to the windshield curvature but does not compensate for the lifting force created by the flow of air at high driving speeds.

In another known type of design (DE-AS No. 1,555,256), the contact pressure is increased by a two-armed lever mounted on the hinge pin which connects link and fastening members together. One arm is held on the wiper arm. The other arm is supported on the front surface of a wedge-type disk rotatably mounted on the wiper shaft, whereby said wedge-type disk is axially displaceable. By twisting a matching wedge-type disk from the interior of the vehicle by means of a traction rope, the upper wedge-type disk is axially displaced and thereby the pressure of the wiper blade on the windshield is varied. The curvature of the windshield is taken into consideration in that the front surface of the upper wedge-type disk has a cam contour adapted to the curvature of the windshield and the one arm of the lever rolls along said cam. In this assembly, the reversing element, that is, the lower wedge-type disk, is adjustable, whereby in addition to the normal spring pressure, a pressure is exercised on the wiper arm via the lever.

The effectiveness of the lever may be reduced under unfavorable weather conditions, e.g. ice and snow, by wedging of ice pieces and dirt between its arms and the wiper arm portions. At high driving speeds, the contact pressure of the wiper blade on the windshield is diminished thereby inhibiting effective cleaning of the windshield. Furthermore, the wedging of ice and dirt may be such that the lever will not reset.

SUMMARY OF THE INVENTION

The disadvantages of the prior arrangements are avoided in that, according to the invention, the holding pin is adjustably articulated on the fastening member in order to vary the contact pressure by taking into consideration the driving speed.

The holding pin is safely protected on the fastening member. By adjusting the holding pin, the contact pressure exerted by the wiper arm spring is directly changed.

In a preferred embodiment of the invention, the holding pin is vertically adjustable to the longitudinal direction of the wiper arm spring suspended on it so that the force component pressing the wiper arm and the wiper blade against the windshield and thus, the contact pressure is changed. Thereby, additional parts exercising a force on the wiper are no longer necessary. The contact pressure can be increased by 30 to 40% by adjusting the holding pin.

Further in accordance with the principles of the invention, the movement of the holding pin is automatically released by a device consisting of a reversing element and an adjusting element, preferably an electric motor, electromagnet or device depending on impact pressure. Also, the resetting of the holding pin into a position corresponding to a normal contact pressure of the wiper blade on the windshield is effected automatically.

The advantage over manually adjustable arrangements is that the driver's attention is not drawn away from the traffic when it is necessary to change the contact pressure. Also, the driver cannot forget to reduce contact pressure on the wiper blades. Because of the considerable friction between wiper blades and windshield, a driver's failure to reduce the contact pressure would cause premature wearing of the wiper blades and result in an overload of the drive means.

An electric motor or the electromagnet is coupled with a device, the characteristics of which depends on the vehicle speed, e.g. the speedometer. In a device depending on impact pressure, not only the relative wind, but also an additionally created contrary wind is taken into consideration which also contributes to the lifting effect on wiper arms and wiper blades.

The impact pressure thereby acts against the force of an adjusting spring. The adjusting spring is arranged so that the holding pin is returned into its normal position by the adjusting spring via the reversing element when the driving speed is diminished and the impact pressure related to it is reduced.

Further in accordance with the invention, an adjusting spring is initially tensioned by another mechanism, e.g. by a push rod connected with the linkage. In this case, an electromagnet only provides a holding function and accordingly is of small size.

In a particularly advantageous embodiment according to the invention, the position of the holding pin not only depends on the vehicle speed, but beyond a predetermined vehicle speed also from the curvature of the windshield area which is just being wiped. The holding pin is permanently coupled with the reversing element and is conducted by it over the entire area of motion.

A simple but very effective method to vary the contact pressure is achieved when, according to particular developments of the invention, the holding pin is adjustable by the adjusting mechanism from one stable area into another stable area.

The available stable areas in which the wiper arm spring always tends to draw the holding pin into an end position makes it possible to use a simple design in order to take the windshield curvature into consideration. Then the holding pin can, of course, be only moved within one stable area. In the first half of a wiping period, the holding pin is moved against the force of the wiper arm spring via a control cam. In the second half, it is reset via the wiper arm spring.

There are three alternatives for adjusting the holding pin from one stable area into the other during one wiping period. The holding pin can be adjusted in one end position of the wiper arm, in any desired fixed point approximately in the middle of the wiping area, or at any desired time of the wiping cycle.

The two last-mentioned possibilities result in an immediate or rapid adjustment of the holding pin when the adjusting member becomes active. In the first case under certain circumstances, an entire wiping cycle can be executed between the release of the adjusting member and the adjustment of the holding pin.

The reversing elements necessary for connecting the holding pin with the adjusting member can be mounted on the wiper shaft itself or can separately be guided via the vehicle body. Whereas, no further parts projecting from the vehicle's body are necesary anywhere for the kind of bearing on the wiper shaft, a separate guidance of the reversing elements prevents an additional loading on the wiper shaft. Under certain circumstances, after market installation of the device according to the invention is thus possible.

BRIEF DESCRIPTION OF THE DRAWINGS

The invention may be better understand from the following detailed description in conjunction with the drawings wherein like reference numerals indicate like parts and in which:

FIG. 1 is a longitudinal section through a wiper arm and wiper shaft of an embodiment according to the invention, whereby the reversing element is guided through the hollow wiper shaft;

FIG. 2 is a longitudinal section through a second embodiment, in which the holding pin is adjusted by an adjusting member dependent on the impact pressure;

FIG. 3 is a top view of the reversing disk according to FIG. 2 in a second position and without the wiper arm;

FIG. 6 is a perspective view of a device according to the invention having a particular bearing shaft for the reversing disk;

FIG. 7 is a longitudinal section through a wiper arm with wiper shaft in parking position, whereby the holding pin is adjusted by displacing of two bolts;

FIG. 8 is a section through a further embodiment of the two bolts;

FIG. 9 is a longitudinal section through a device according to the invention by which the curvature of the windshield is taken into consideration for contact pressure change; and FIG. 10 is a top view of the device according to FIG. 9 without the wiper arm.

DETAILED DESCRIPTION OF THE DRAWINGS

Figure 4:
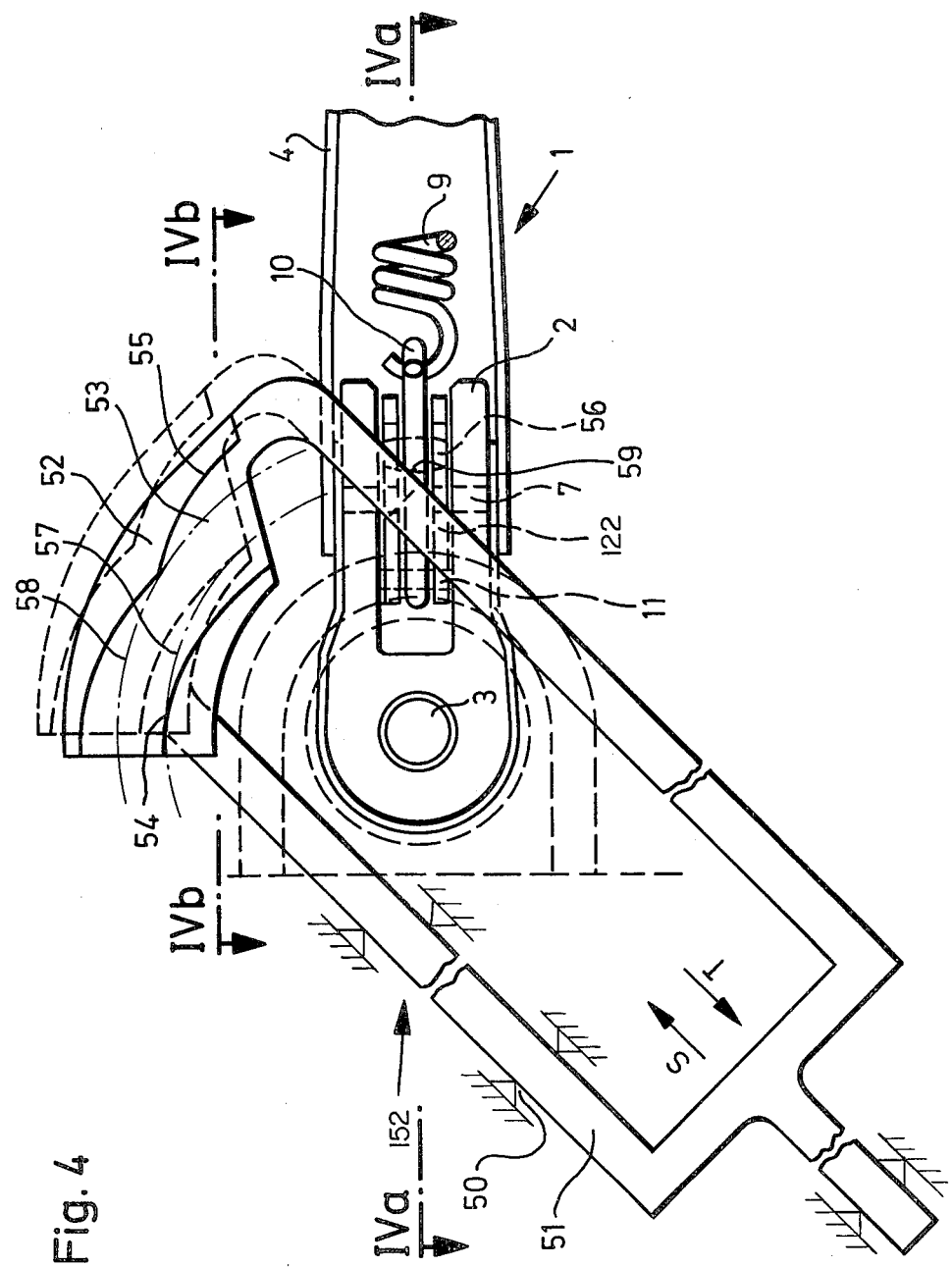
FIG. 4 is a schematic view of a further device according to the invention.

In the various drawing figures, a wiper arm 1 is mounted on a wiper shaft 3 by a fastening member 2 in a manner protected against twisting. Furthermore, the wiper arm consists of a link 4 and a wiper rod 5. Fastening member 2 and link 4 are connected with each other by a hinge pin 7 guided in a hub 6. A nut 8 secures the wiper arm 1 against loosening from the wiper shaft 3.

In the U-shaped link 4, a wiper arm spring 9 is accommodated which exerts a pressure on the wiper blade, not shown in the drawings, against the windshield. Spring 9 suspended on a holding pin 11 via the C yoke 10. This holding pin 11 is fastened on the lever 12 which is articulated on the fastening member 2 via the bearing pin 13. The lever 12 and thereby the holding pin 11 is operatively connected with the adjusting member 16 via the reversing nose 14, the changeover element 15 and further connecting elements, if necessary. The adjusting member 16 is not shown in each of the figures.

In the particular adjusting mechanism of FIG. 1 according to the invention, the holding pin 11 is attached on the arm 17 of the two-armed lever 12. The reversing bolt 18 serving as a reversing element is guided in the hollow wiper shaft 3, the upper end of said reversing bolt is provided with a groove 19 and an adjusting cap 20. The reversing nose 14 is designed as angular portion 22 which represents a continuation of the lever arm 17 on the side of the wiper shaft and has an oblong hole receiving the annular groove 19 of the reversing bolt 18 and connects lever 12 and reversing bolt 18.

When the contact pressure is normal, the reversing bolt 18 is extended. Reversing bolt 18 is moved by an adjusting member comprising motor or elecromagnet, which is not shown, which is actuated at a particular vehicle speed. Angular portion 21, lever 12, holding pin 11, C yoke 10 and wiper arm spring 9 then occupy the position in FIG. 1 indicated by continuous lines. In this position, the lever arm 17 is pressed against the fastening member 2 by the wiper arm spring 9. As soon as the holding pin 11 tends to leave this position, the wiper arm spring tries to keep it back. The adjusting member acts against this spring force at a particular speed. The reversing bolt 18 is drawn downward, the adjusting cap 20 takes along the angular portion 21, the lever 12 is tilted and the holding pin 11 is moved downwards. As soon as said holding pin has crossed an imaginary plane which is defined by the suspension point 23 of the wiper arm spring 9 on the wiper rod 5 and a straight line through the center of the bearing pin 13, it is drawn into the position indicated by dotted lines in which the second lever arm 24 supports on the fastening member 2 and the contact pressure is increased. In this position, the adjusting cap 20 of the reversing pin 18 rests upon the upper end of the wiper shaft 3. Because the holding pin 11 cannot leave the two areas of motion divided by the plane mentioned without being affected from outside, they may be designated as stable. In these areas, the lever 12 does not exert force on the reversing bolt 18. In this embodiment, the adjusting member is switched off when the stable positions are obtained.

In the particular adjusting mechanism shown in FIGS. 2 and 3, little space is required and the appearance of the windshield wiper assembly is hardly changed. The lever 121 is articulated on the fastening member near the wiper shaft 3 by the bearing pin 13. Lever 12 is a U-shaped member having a pair of parallel side arms 24 and a web or cross arm 30. The holding pin 11 is fastened on the arms 241. The arm 30 together with the cam 31 form the reversing nose 141. A two-stage reversing disk 32 is rotatably mounted on the wiper shaft 3 as a reversing element 151. The vertical surface 33 of the upper stage 34 is designed as a guide surface for the cam 31. It is provided with two indents 35 and 36 into which the cam 31 can engage. The lower stage 37 of the reversing disk 32 has two circular grooves 38 and 39 being located on different radii and overlapping over a length which corresponds to the width of the two bolts 40 and 41. In these grooves 38 and 39, two cranked bolts 40 and 41 are positioned which are connected with each other via the lever portion 42 with three bearings. Impact air pressure is conducted by pipe such that it will exert pressure against the bottom of bolt 41.

At low speed, the pressure exercised on the bolt 40 via the adjusting spring 43 is greater than the force acting of the bottom of the bolt 41 and the bolt 40 is positioned in the groove 38. The cam 31 engages the indent 35 which is farther away from the center point of the wiper shaft 3 than the indent 36. Thus, the lever 121 is tilted into the position indicated by continuous lines.

If the force exerted on the bottom of bolt 41 is greater than the force exerted by spring 43 on bolt 40, the bolt 41 is pushed upwards into the groove 39 and the bolt 40 glides out of the groove 38. Cam 31 leaves the indent 35. Wiper arm spring 9 forces cam 31 into the indent 36. Now the lever 121 occupies the position indicated by dotted lines and the contact pressure is increased.

The changeover between the two positions of the lever is more clearly understood with reference to FIG. 3. The cam 31 is engaged into the indent 36. The reversing disk moves with the wiper arm. The bolt 41 runs in the groove for increased contact pressure. When the impact pressure is diminished, the spring 43 pushes the bolt 40 upwards. Provided that the wiper arm 1 does not occupy the parking position at that time, bolt 40 hits the underside 45 of the stage 37. In the overlapping zone 46 of the two grooves 38 and 39, however, bolt 40 jumps into the groove 38 and blocks a further rotation of the reversing disk 32 because it meets the end 47. Thus, the cam 31 slides along the surface 33 and engages into the indent 35. Bolt 40 no longer hinders the reversing disk 32 because it can now run in the groove 38. The change over from low to high contact pressure is obtained according to the same principle.

Figure 5:
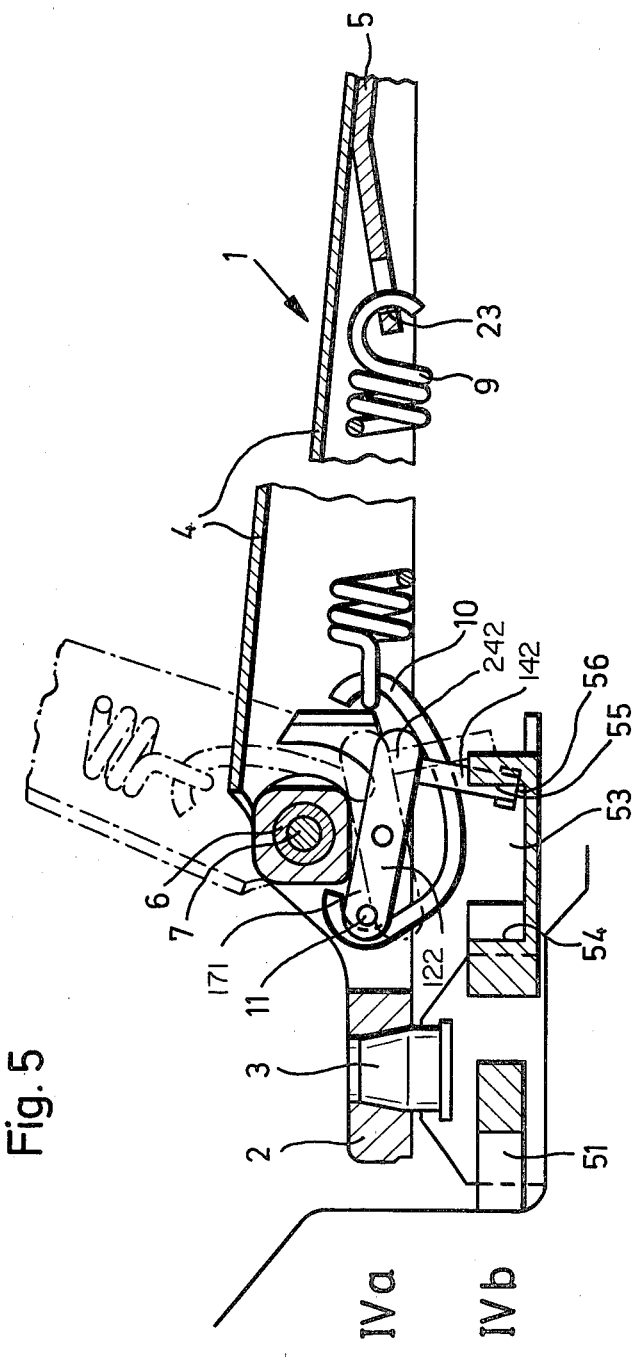
FIG. 5 is a longitudinal sectional view of the embodiment shown schematically in FIG. 4.

FIGS. 4 and 5 show a particular design of an adjusting mechanism according to the invention which is characterized by the fact that no changes were made on the wiper shaft. FIG. 4 is a schematic representation of the structure of FIG. 5 drawn in such a manner as to show how the lever 12 of FIG. 5 is changed over. This time the holding pin 11 is again fastened on the arm 171 of the two-armed lever 122 pointing to the wiper shaft. The second arm 242 of the lever 122 carries a reversing nose 142 directed downwards. Below the fastening member 2, a yoke 51 is attached which serves as reversing element 15 and is guided in the bearings 50 and displaceable in direction of the arrows S or T in a plane vertical to the wiper shaft 3. On the broad portion of the transversal web on the side of the wiper arm, a groove 53 is milled which is laterally limited by the two stop faces 54 and 55.

When the contact pressure is normal, the reversing yoke 51 and the reversing nose 142 occupy the position indicated by continuous lines. The point 59 closest to the wiper shaft 3 and located on the lower limiting surface 56 of the reversing nose 142 then moves freely on the dash-dotted arc of a circle 57. When the contact pressure is to be increased, the reversing yoke 51 is then displaced in the direction of arrow S into the position shown by the broken lines. The reversing nose 142 abuts against the stop face 54 and the holding pin 11 is tilted downwards by the lever 122. Now the point 59 moves on the dash-dotted arc of a circle 58. When the contact pressure is diminished, the reversing yoke 51 is drawn back in direction of arrow T into the initial position. The reversing nose 142 abuts against the stop face 55. The holding pin 11 is tilted upwards by the lever 122. Both positions of the lever 122 are again stable as described above.

In another embodiment of the invention which is shown in a perspective view in FIG. 6, an axle 60 is provided which is rotatable about its longitudinal axis and which is arranged parallel to the wiper shaft 3. A reversing disk 34 is mounted on a particular axle 60 in a manner protected against twisting. This axle 60 is arranged in parallel to the wiper shaft 3. The reversing disk 32 has two stop faces 61 and 62 for the reversing nose 142. The embodiment of FIG. 6 includes lever 122 holding pin 11, C yoke 10, wiper arm spring 9 and reversing nose 142 all as shown in FIG. 5 but only reversing nose 142 of which is visible in FIG. 6. The reversing nose, however, must not be located in the same position on the lever as shown in FIG. 5. There it has to be fastened on the lever 12 far away from the wiper shaft 3 because the groove 53 of the reversing yoke 51, due to lack of space, cannot be located nearer to the wiper shaft 3.

The adjusting member 161 comprises on adjusting spring 63 and an electromagnet 64 having a movable bolt 68. The adjusting spring 63 is supported on one end by a hole in flat bar or portion 66 and on its other end by a hole in disk 65 which is immovably supported on the vehicle body. Although axle 60 may rotate about its longitudinal axis, the disk 60 is immovable. In the position shown, the spring 63 is under considerable tension and urges the flat portion 66 against bolt 68. The bolt 68 of the electromagnet engages in the recess 67 of the flat portion 66. Because the electromagnet 64 only exercises a holding function for the bolt 68, it can be small. A push rod 69 is pivotally connected at one end to flat portion 66 and at its other end includes an oblong hole 71. A linkage for driving the wiper assembly includes a linkage 73 coupled to the wiper drive unit (which is not shown) and pivotally connected to a link 731 which in turn is connected to the wiper shaft 3. Link 731 carries a pin 72 which is guided in the oblong hole 71. In most typical windshield wiper assemblies, the linkage rotates the shaft 3 and thereby the wiper arm 1 through a predetermined wiping angle of approximately 110°. As is explained in greater detail below, when contact pressure is to be increased, bolt 68 prevents movement of flat portion 66, and when there is to be a change over to normal contact pressure, bolt 68 is withdrawn, permitting flat portion 66 to swing in pendulum like motion following the movement of link 731.

When the contact pressure is increased, bolt 68 of the electromagnet engages recess 67. Spring 63 holds the flat portion 66 in engagement with bolt 68 and thereby holds axle 60 and the reversing disk 321 in the position shown. The lever carrying reversing nose 142 will be in a stable position such that the lower end of reversing nose 142 is further away from wiper shaft 3 than when the contact pressure is normal. As the linkage 73 and link 731 drive the wiper in pendulum motion, pin 72 of link 731 moves freely to and fro in the oblong hole 71 since bolt 68 prevents spring 63 from urging flat portion 66 from the position shown. Under these conditions, nose 142 traverses an arc passing outside the reversing disk 321 alongside stop face 61. The reversing disk thereby does not act upon reversing nose 142.

If now it is to be changed over to normal contact pressure, the electromagnet 64 withdraws the bolt 68 and the adjusting spring 63 presses the end 75 of the oblong hole 71 against the pin 52 so that the axle 60 between linkage 73 and adjusting spring 63 alternatingly exercises the same rotary pendulum motion as the wiper shaft 3. The angular arc through which the reversing disk 321 swings may be freely selected. In the embodiment shown, the angular arc of motion of the reversing disk 321 is the same as that of the wiper arm 1, e.g., 110 degrees. The shape of the reversing disk 321 and the angular arc of motion are such that at a predetermined angle, e.g., 90 degrees, the reversing nose 142 will engage stop face 62 and over the course of the remaining portion, e.g., 20 degrees, of the arc will travel along stop face 62 and the reversing nose 142 will move the lever to its second stable position. Thus, each time when the wiper arm 1 approaches the reversing disk 321 during the wiping cycle, the reversing nose 142 is turned by an angle, the legs of which are forming the axis of the flat portion 66 and the dash-dotted line. As soon as the wiper arm 1 swivels into its parking position when the bolt 68 is withdrawn, the reversing nose 142 abuts against the stop face 62, is pressed towards the wiper shaft 3 and tilts the lever 12 into the stable position of normal contact pressure. Under normal contact pressure, the reversing nose 142 is then unaffected by the stop face 62 of the reversing disk 321. If movement of the reversing disk 321 is again arrested, bolt 68 engaging flat portion 66 the reversing nose 142 returns into its initial position by running up the surface 61. Both ranges of the lever 12 are stable in the manner already described.

The adjusting mechanism according to FIG. 7 is especially suitable to be built into a vehicle after its completion because wiper shaft 3 and linkage 73 are not at all varied in comparison to a usual windshield wiper installation. In this embodiment, the lever has the shape of a reversed U with the two legs 80 and 81 which operate as reversing noses 144. The end faces 82 and 83 of these legs are inclined relative to the lateral surfaces 84. The reversing bolts 86 and 87 are guided through the vehicle body in such a way that in the parking position of the wiper arm 1, they are located below the legs 80 and 81. They form the adjusting element 153. In the two stable positions which the lever 123 occupies as well as in this case and which are shown by means of continuous and dotted lines, none of the bolts 86 and 87 touches a leg 80 or 81.

If the contact pressure is to be changed, one of the bolts 86 and 87 is extended in dependence on whether the contact pressure is increased or reduced. The corresponding leg 80 or 81 with its inclined end face running up on the bolt is pressed upwards and thereby reverses the lever 123.

As can be seen from FIG. 8, the two bolts can also be connected by the transversal web 88 and its center being rotatably mounted on the bearing bolt. Thus, when the one bolt is tilted outwards, the other is simultaneously withdrawn.

By means of FIGS. 9 and 10, a mechanism according to the invention is described at last the contact pressure of which is varied in accordance with the curvature of the windshield from a given speed onwards.

The reversing nose 145 of the lever 124 in the lower part 90 has the shape of a cylinder. Holding pin 11 is carried by lever arm 172. The change over element is shown generally at 154. The cranked bridging member 91 is attached on the cylinder 90 to be rotated and swivelled and rotatably connected with the reversing disk 32 which is rotatably mounted on the wiper shaft 3 by the rivet 92. The bolt 93 of the adjusting member can engage into a recess 94 on the rim of the reversing disk 32 and arrest it thereby. The bolt 93 can be secured into one of two positions by a ball 99 pressed into the annular groove 97 or 98 by a spring 96 supporting on the screw 95. The bolt 93 may be moved by an electromagnet such as the one shown in FIG. 6 which is coupled to the speedometer such that at a predetermined velocity the electromagnet is operated. The pin 100 is guided in the circular groove 101, the length of the arc of which corresponds to the length of the wiping arc.

If the reversing disk 145 is arrested by the bolt 93, the rivet 92 is fixed too and the lower part 90 is moved on the dash-dotted line 102 when the wiper arm 1 is actuated because the distance of the rivet 92 to said wiper arm is constant. Thus, the lever 124 is variably tilted and the contact pressure of the wiper blade on the windshield varies with the curvature of the windshield. The pin 100 is located in the end 103 of the groove 101.

If the contact pressure is to be maintained at a low level, the bolt 93 is withdrawn by the adjusting member 162. If the wiper arm 1 in this moment moves in direction of arrow A in FIG. 10, the pin 100 runs up on the end 103 of the groove 101. The reversing disk 322 is thereby arrested furthermore. The reversing nose 145 is guided on the dash-dotted arc of a circle 104. Thereby, the lever 124 tilts the holding pin 11 in upward direction. Thus, this position is stable. During the further wiping motion, the pin 100 runs in the groove 101 and the reversing nose 145 moves on the arc of circle 104.

When, at this moment at which the bolt 93 is withdrawn, the wiper arm moves into direction B, the pin 100, at first, runs away from the end of the groove 101 and changes its direction of movement, when the wiper arm 1 changes the direction of movement and exactly at that time pushes against the end 103 of the groove 101, when the wiper arm occupies the position in which the reversing disk 322 is released.

What is claimed is:

1. A wiper assembly for a windshield on a vehicle comprising:
   a wiper motor shaft, and a wiper arm, said wiper arm comprising:
   a wiper blade;
   a wiper rod carrying said wiper blade;
   a link coupled to said wiper rod;
   a fastening member articulated to said link and mounted on said wiper shaft;
   a wiper arm spring having one end connected to said wiper rod;
   a lever pivotally connected to said fastening member;
   a holding pin carried by said lever and coupled to the other end of said spring; and
   actuating means operable while said wiper arm is operating for moving said lever to selectively place said holding pin in first and second predetermined positions, whereby when said holding pin is in said first or said second predetermined position, said wiper blade is urged against said windshield at a first or a second level of pressure, respectively; the direction of movement of said holding pin between said first and second predetermined positions being approximately perpendicular to the longitudinal axis of said spring.

2. A windshield wiper assembly in accordance with claim 1, comprising an adjusting means selectively operative for causing said actuating member to move said lever to place said holding pin in said first or second predetermined positions.

3. A windshield wiper assembly in accordance with claim 2, wherein said adjusting element comprises an electromagnet.

4. A windshield wiper assembly in accordance with claim 2, wherein said adjusting means comprises a spring actuated element to engage said actuating means such that said holding pin is maintained in said first predetermined position and a release element movable to engaging said actuating means such that said holding pin is released from said first predetermined position.

5. A windshield wiper assembly in accordance with claim 2, wherein said first predetermined position is in one stable area and said second predetermined position is in another stable area.

6. A windshield wiper assembly in accordance with claim 2, wherein said holding pin is movable from either of said first or said second predetermined positions to the other of said first or said second predetermined positions when said wiper arm is in a predetermined position.

7. A windshield wiper assembly in accordance with claim 2 wherein said actuating means comprises a reversing bolt coupled to said lever and movable on an axis parallel to said wiper motor shaft, and a guide for said reversing bolt to limit movement of said reversing bolt such that said reversing bolt is movable only in the longitudinal directions of said axis.

8. A windshield wiper assembly in accordance with claim 2 wherein said actuating means comprises a reversing disk rotatably mounted on an axis parallel to said wiper motor shaft, said reversing disk having first and second stop faces and a guide surface, said lever being supported on said guide surface and movable relative to said guide surface to engage said first or second stop faces, said first and second stop faces being positioned at different radial distances from said axis.

9. A windshield wiper assembly in accordance with claim 8, wherein said reversing disk is mounted such that when said wiper arm is in a parking position, said reversing disk is positioned below said lever; and wherein said actuating means further comprises an axle carrying said reversing disk; said adjusting means comprising a flat member coupled to said axle, said flat member being movable between first and second positions, a spring element coupling said flat member to said reversing disk; said wiper assembly further comprising linkage means coupling said motor shaft to said wiper arm; said actuating means further comprising a push rod pivotally connected to said flat member and coupled to said linkage, said linkage, said push rod, said flat member and said spring cooperating such that movement of said linkage causes movement of said reversing disk such that when said wiper arm is moved, said lever passes alongside said first surface and said holding pin is in said first predetermined position, said adjusting means further comprising a holding element operable to arrest movement of said flat member such that when said wiper arm is moved, said lever passes along said second surface and said holding pin is placed in said second predetermined position.

10. A windshield wiper assembly in accordance with claim 2 wherein said actuating means comprises a reversing disk rotatably mounted on a plane substantially perpendicular to said wiper motor shaft; and a guide surface, said lever being supported on said guide surface; and said reversing disk being movable to carry said lever such that said holding pin is placed in said first or second predetermined positions.

11. A windshield wiper assembly in accordance with claim 2, wherein said adjusting means comprises a first part for causing movement of said holding pin in one direction and a second part for causing movement of said holding pin in another direction.

12. A windshield wiper assembly in accordance with claim 2, wherein said lever includes first and second arm portions and an intermediate angular portion; said holding pin being located on said first arm portion; said wiper shaft is hollow; said actuating element includes a reversing bolt guided in said hollow wiper shaft and coupled to said second arm portion, said actuating element being movable between first and second predetermined positions.

13. A windshield wiper assembly in accordance with claim 2, wherein said lever comprises first and second legs and a connecting leg arranged in a U shape, said first leg being closest to said wiper shaft and carrying said holding pin; and said actuating member comprises first and second movable bolts, said first bolt being positioned below the end surface of said first leg when said holding pin is in said first predetermined position and said second bolt being positioned below the end surface of said second leg when said holding pin is in said second predetermined position, said first and second movable bolts being movable to move said lever to change the position of said holding pin from one of said first or said second predetermined positions to the other of said first or said second predetermined positions.

14. A windshield wiper assembly in accordance with claim 13, further comprising a transversal web connecting said first and second movable bolts and tiltably mounted at its center.

15. A windshield wiper assembly in accordance with claim 1, wherein said actuating means comprises a reversing yoke mounted on an axis parallel to said wiper motor shaft, said yoke being movable to engage said lever and to carry said lever such that said holding pin is placed in said first or said second position.

16. A windshield wiper assembly in accordance with claim 1, wherein said actuating means comprises a reversing yoke mounted in a plane substantially perpendicular to said wiper motor shaft, said yoke being movable to engage said lever and to carry said lever such that said holding pin is placed in said first or said second position.

17. A windshield wiper assembly in accordance with claim 16, wherein said yoke includes a transverse web having a groove, and said lever includes a first arm carrying said holding pin and a second arm adapted to engage said groove, the walls of said groove and said second arm being cooperatively adapted such that movement of said yoke in one direction beyond a predetermined point moves said lever to a first stable position to place said holding pin in said first predetermined position and movement of said yoke in the opposite direction beyond said predetermined point moves said lever to a second stable position to place said holding pin in said second predetermined positions.

18. A windshield wiper assembly in accordance with claim 1, wherein said lever includes a cam; said actuating means comprises:

a two-stage reversing disk rotatably mounted on said wiper shaft; one stage of said reversing disk having a rim adapted as a guide surface for said cam and including two indents, each of said indents being adapted to engage said cam and each of said indents being spaced apart from the center of said wiper shaft by different distances;

a second stage of said reversing disk including first and second circular grooves each located on a different radius and overlapping in length;

a first movable bolt adapted to engage said first circular groove;

a second movable bolt adapted to engage said circular groove and coupled to said first movable bolt such that movement of said second movable bolt into engagement with said second circular groove disengages said first movable bolt from said first circular groove and movement of said second movable bolt out of engagement with said second circular groove moves said first bolt into engagement with said first circular groove; and means for moving said second movable bolt comprising a spring and means responsive to impact pressure.

* * * * *